(12) United States Patent
Huber et al.

(10) Patent No.: US 10,555,279 B2
(45) Date of Patent: *Feb. 4, 2020

(54) FACILITATION OF CHANNEL SELECTION WITHIN A WIRELESS NETWORK

(71) Applicants: AT&T Mobility II LLC, Atlanta, GA (US); AT&T Intellectual Property I, L.P., Atlanta, GA (US)

(72) Inventors: Kurt Huber, Kennesaw, GA (US); Jerome Hetrick, Flower Mound, TX (US); Thomas W. Henderson, Alpharetta, GA (US); Hristo Hristov, Addison, IL (US)

(73) Assignees: AT&T MOBILITY II LLC, Atlanta, GA (US); AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/033,402

(22) Filed: Jul. 12, 2018

(65) Prior Publication Data

US 2018/0324763 A1 Nov. 8, 2018

Related U.S. Application Data

(63) Continuation of application No. 14/937,251, filed on Nov. 10, 2015, now Pat. No. 10,051,608.

(51) Int. Cl.
*H04W 4/00* (2018.01)
*H04W 72/04* (2009.01)
(Continued)

(52) U.S. Cl.
CPC .......... *H04W 72/04* (2013.01); *H04L 5/0041* (2013.01); *H04W 64/00* (2013.01)

(58) Field of Classification Search
CPC .......... H04W 72/04; H04W 64/00; H04L 5/00
See application file for complete search history.

(56) References Cited

U.S. PATENT DOCUMENTS 6,175,551 B1    1/2001   Awater et al.
7,596,127 B1    9/2009   May et al.
(Continued)

FOREIGN PATENT DOCUMENTS

EP    2643993 A1   10/2013
WO   9501033 A1    1/1995
(Continued)

OTHER PUBLICATIONS

Garcia, et al., "Autonomous Component Carrier Selection for 4G Femtocells—A fresh look at an old problem—", IEEE Journal on Selected Areas in Communications, Apr. 2012, 15 pages, IEEE.
(Continued)

*Primary Examiner* — Abdelillah Elmejjarmi
(74) *Attorney, Agent, or Firm* — Amin, Turocy & Watson, LLP

(57) ABSTRACT

A more efficient network can be achieved using channel allocation strategies within a wireless network. A network device can receive several data points from a mobile device including resource request data, access condition data, and location data. Once the network device has received the aforementioned data points, the network device can identify channels that are conducive to a heightened quality of service for a resource being requested based on a signal attenuation associated with the channel. The network device can then facilitate a channel selection in response to an assessment of the data points and identifying a channel for the resource.

20 Claims, 12 Drawing Sheets

(51) Int. Cl.
*H04W 64/00* (2009.01)
*H04L 5/00* (2006.01)

(56) References Cited

U.S. PATENT DOCUMENTS

| | | |
|---|---|---|
| 8,145,132 B2 | 3/2012 | Amerga et al. |
| 8,606,261 B2 | 12/2013 | Weng et al. |
| 8,614,979 B2 | 12/2013 | Cox et al. |
| 8,892,050 B2 | 11/2014 | Shellhammer et al. |
| 8,913,646 B2 | 12/2014 | Schmit et al. |
| 9,066,223 B2 | 6/2015 | Ralston et al. |
| 9,094,917 B2 | 7/2015 | Charbit et al. |
| 2004/0203824 A1 | 10/2004 | Mock et al. |
| 2005/0221754 A1 | 10/2005 | Poykko |
| 2010/0054145 A1 | 3/2010 | Frenger et al. |
| 2012/0026970 A1 | 2/2012 | Winters et al. |
| 2014/0016588 A1 | 1/2014 | Garcia et al. |
| 2014/0115637 A1 | 4/2014 | Stanforth |
| 2014/0128091 A1 | 5/2014 | Engstrom |
| 2014/0211644 A1 | 7/2014 | Giannakis et al. |
| 2015/0003378 A1 | 1/2015 | Jones, IV et al. |
| 2015/0156635 A1 | 6/2015 | Liang et al. |
| 2015/0171925 A1 | 6/2015 | Ling |

FOREIGN PATENT DOCUMENTS

| | | |
|---|---|---|
| WO | 2004010719 A1 | 1/2004 |
| WO | 2013138010 A1 | 9/2013 |
| WO | 2013183465 A1 | 12/2013 |

OTHER PUBLICATIONS

Cimini, et al., "Advanced Cellular Internet Service (ACIS)." IEEE Communications Magazine, Oct. 1998, pp. 150-159, IEEE. 11 pages.

Sreng, et al., "Relayer Selection Strategies in Cellular Networks with Peer-to-Peer Relaying", Vehicular Technology Conference, 2003, 5 pages, vol. 3. IEEE.

Son, et al, "Serving Node Selection in Wireless Multi-hop Cellular System", Vehicular Technology Conference, 2006, 5 pages, IEEE.

Non-Final Office Action received for U.S. Appl. No. 14/937,251, dated Jun. 22, 2017, 28 pages.

Final Office Action received for U.S. Appl. No. 14/937,251, dated Oct. 17, 2017, 29 pages.

FACILITATION OF CHANNEL SELECTION WITHIN A WIRELESS NETWORK

RELATED APPLICATION

The subject patent application is a continuation of, and claims priority to, U.S. patent application Ser. No. 14/937,251 (now U.S. Pat. No. 10,051,608), filed Nov. 10, 2015, and entitled "FACILITATION OF CHANNEL SELECTION WITHIN A WIRELESS NETWORK," the entirety of which application is hereby incorporated by reference herein.

TECHNICAL FIELD

This disclosure relates generally to facilitating channel selection within a wireless network. More specifically, this disclosure relates to identifying and adjusting channel selection based on dynamic criterion of mobile device usage.

BACKGROUND

In radio resource management for wireless and cellular networks, channel allocation systems allocate bandwidth and communication channels to base stations, access points, and terminal equipment. The objective is to achieve maximum system spectral efficiency in bit/s/Hz/site by means of frequency reuse, but still assure a certain grade of service by avoiding co-channel interference and adjacent channel interference among nearby cells or networks that share the bandwidth. The two types of common channel selection strategies include fixed channel allocation and dynamic channel allocation. Channels can be manually assigned by a network operator within a fixed channel allocation system, and access points can automatically select frequency channels within a dynamic channel allocation system.

The above-described background relating to a channel allocation is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
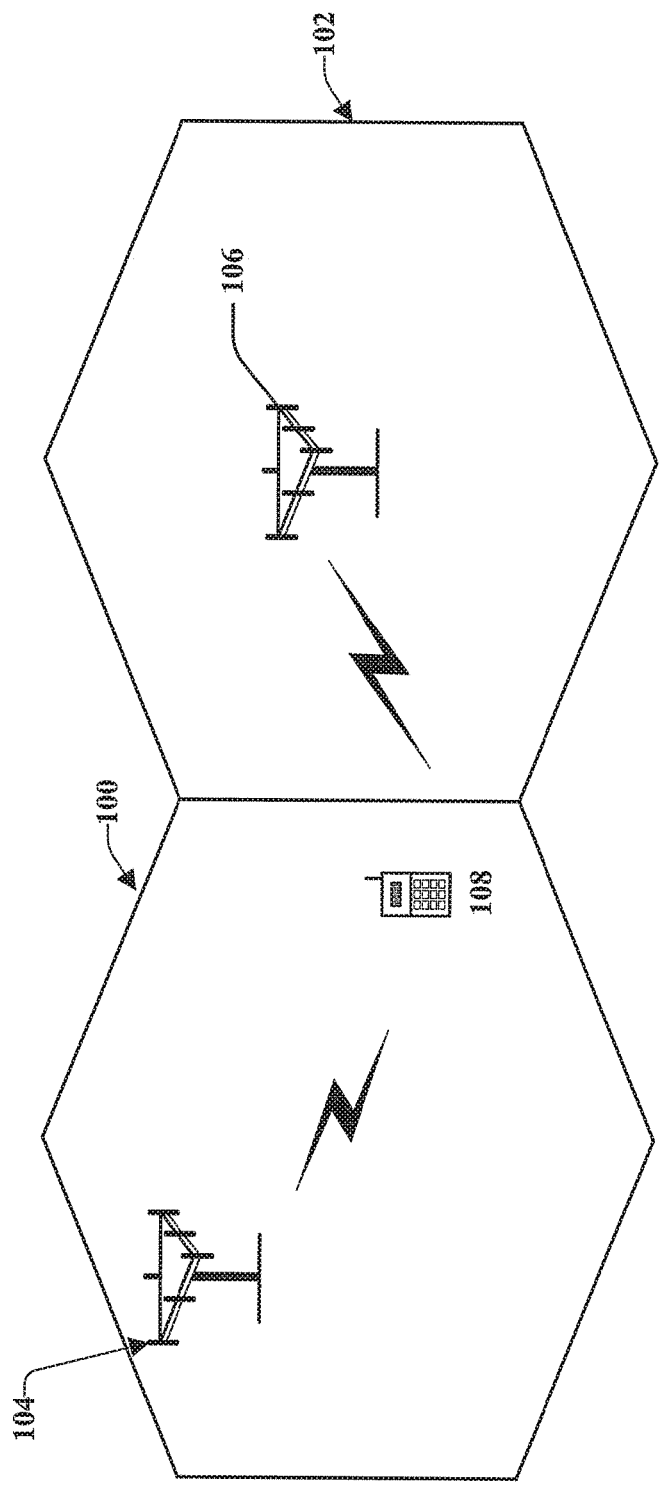
FIG. 1 illustrates an example wireless network comprising a mobile device transitioning between cellular coverage areas and communicating with base stations respective to each cellular coverage area according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview of the various embodiments presented herein, to correct for the above-identified deficiencies and other drawbacks of traditional cellular mobility management, various embodiments are described herein to facilitate a seamless channel selection between mobile devices and network devices.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

Described herein are systems, methods, articles of manufacture, and other embodiments or implementations that can facilitate wireless network channel selection. Facilitating of wireless network channel selection can be implemented in connection with any type of device with a connection to the communications network such as: a mobile handset, a computer, a handheld device, or the like.

The present disclosure addresses carrier selection based off service requirements for coverage and quality. When initiating communication on a cellular network, the service requirements can be based on the needs of an individual customer in relation to their geometry and impairments within the cellular network. In the cellular network, the coverage can be determined by a link budget of a frequency, but it can also be based on a received power level measured in millivolts (mV) per meter. A link budget is an accounting of all of the gains and losses from a transmitter, through a medium (free space, cable, waveguide, fiber, etc.) to a receiver in a telecommunication system. The link budge can take into account attenuation of a transmitted signal due to propagation, as well as antenna gains, feedline and miscellaneous losses. Randomly varying channel gains such as fading can be taken into account by adding some margin depending on the anticipated severity of its effects. For example, a simple link budget equation can comprise:

$$\text{Received Power(dBm)} = \text{Transmitted Power(dBm)} + \text{Gains(dB)} - \text{Losses(dB)} \qquad \text{Eqn (1)}$$

Power spectral density (PSD) can be achieved for a carrier as a function of power transmitted divided by bandwidth transmitted. Therefore, spectrum, on a per service level, can be efficiently used to extend difficult and highly user perceived services, such as voice, on narrower channels to achieve a higher PSD. Consequently, the higher PSD can provide better specific service coverage into areas and structures that would otherwise drive a higher cost solution. Effectively, the spectrum can be used in smaller bandwidths to increase the received density for real time services, such as voice over long-term evolution (VoLTE), to compliment capacity or extend services that are highly perceived by the customer. Cellular systems can benefit from the higher PSD to achieve reliable quality communication.

Based on the aforementioned power to bandwidth ratio, increasing the bandwidth, decreases the power. Consequently, provisioning wider carriers can cause gains for bandwidth for data but a loss in range for speed, and subcarriers are proportional to the amount of carrier bandwidth selected. For services that are narrower in band, a narrower carrier can be selected because the services do not need the maximum bandwidth. Thus, dynamic selection of bandwidth can influence where the coverage actually is. For instance, the ability to dynamically select a bandwidth can add 3 decibels to the link budget. Since decibels are logarithmic measurements, adding decibels is equivalent to multiplying the actual numeric ratios.

There can be several opportunities within the cellular network for a dynamic selection of bandwidth to increase PSD including, but not limited to: call initiation, call handoff/transfer, during a call, by a service, or by quality and distance. Effectively, any real-time service or resource such as a voice call or a video call can leverage these efficiencies.

For example, although a 10 MHz channel can be chosen as a priority channel for a real-time voice call of a mobile device, if the mobile device increases its distance from a carrier or base station, the mobile device can near an access threshold where the mobile device will be on the cusp of not being able to receive service. Consequently, any impairment or signal attenuation can cause the mobile device to drop below the access threshold and terminate the voice call. However, preemptive impairment avoidance can be done by selecting a narrower channel (i.e.: going from 10 MHz to 5 MHz) to gain a better link budget.

Narrower channels can have better link budget due to a fixed finite amplifier power, and narrowing the channel bandwidth across can reduce subcarriers. For instance, 40 Watts/10 MHz=4 watts per MHz, and 40 Watts/5 MHz=8 MHz. Therefore the power can be doubled by reducing the bandwidth from 10 MHz to 5 MHz (which can add 3 dB to the link budget, which is two times the power). Although the power increase can cause a slower average in peak throughput to facilitate more range, services like VOLTE can benefit from the power increase because the VOLTE services do not need the peak throughput.

Continuing from the aforementioned example, a 5 MHz channel can support small bursty applications, while a 10 MHz channel can support big data. However, if a mobile device leverages a 10 MHz channel for a small application, then voice quality and resource efficiency will be reduced because additional redundant data will need to be sent across the 10 MHz channel. Conversely, big data being pushed through the 5 MHz channel can cause a loss in a safety net and uplink link budget, thereby initiating a possible loss of all services instead of just the speed of the service being used.

Another object of this disclosure can allow for carrier aggregation for faster downloads by leveraging a dedicated service, such as VOLTE, on a narrower channel to increase the link budget. Within the cellular network a primary channel, a secondary channel, and a tertiary channel can be selected. The primary channel can have upload and download capabilities. However, if the primary channel fails, then all subchannels of the primary channel can fail as well. The secondary channel can also be selected within a cellular network, wherein the secondary channel can comprise download capabilities. Although the primary channel and the secondary channel can be aggregated to increase download capabilities, the primary channel can be utilized upload capabilities. The tertiary channel can also comprise download capabilities. However, if the tertiary channel comprises a lower MHz, then the tertiary channel can be better for voice calls. A determination that the tertiary channel can be better for voice calls can initiate a reprioritization of the channels, whereby the tertiary channel can become the secondary channel to reduce bandwidth loss. For example, although a voice call can retain quality on the tertiary channel, if the mobile device user wants to upload data, then the data can be uploaded on the primary channel. Consequently, a real-time understanding of what mobile device resources a user needs can allow for a dynamic determination of which channel should be used based on a determination of which channels are the primary, secondary, and tertiary channels.

Channel identification and selection can be based on a condition of access. The condition of access can include, but is not limited to: the mobile device distance from a base station, signal attenuation, link budget, resource requests, etc. For example, channel selection can be based on a resource request for a voice call within a defined distance of the mobile device from the base station. If it is determined that the mobile device meets the distance parameter for a voice call, then a specific channel can be chosen dynamically. The channel selection can also take into account the location and distance of the mobile device from a second base station in relation to a first base station. Once the cellular network has identified a channel as an option for channel selection, the channel can be labeled as a potential channel. Furthermore, multiple base stations can receive multiple requests from multiple mobile devices and base channel identification and selection off the interplay of which mobile device needs a channel selection in relation to distances of the mobile devices as they move relative to the base stations.

In one embodiment, described herein is a method comprising receiving a resource request and condition data for access to a wireless network. The method can also comprise receiving location data and identifying a channel based on signal attenuation and the resource request. Consequently, the method can facilitate a channel selection in response to an assessment of the location, the resource request, and the signal attenuation of the mobile device.

According to another embodiment, a system can facilitate, channel selection for multiple devices by receiving resource requests and access data of two mobile devices. The system can also receive location data for the two mobile devices and determine a channel for both mobile devices based on the respective signal attenuations. The system can then facilitate a channel selection for both devices based on analysis of the aforementioned data.

According to yet another embodiment, described herein is a machine-readable medium that can perform the operations comprising receiving a resource request, bandwidth condition data, and location data from a user device. The machine-readable medium can also identify signal attenuation related to multiple channels and aggregate the multiple channels for a selection based on a determination that the aggregated channels satisfies a condition.

These and other embodiments or implementations are described in more detail below with reference to the drawings.

Referring now to FIG. 1, illustrated is mobile device transitioning between cellular coverage areas and communicating with base stations respective to each cellular coverage area. A cellular network can comprise cellular site coverage areas 100, 102 and base stations 104, 106. A mobile device 108 can communicate with the base station 104 while the mobile device 108 is within the cellular site coverage area 100. The mobile device 108 can communicate resource request data, location data, and/or condition data related to a condition of access to the base station devices 104, 106 within the cellular network. A resource request can comprise a request for a voice call, a video call, an upload/download, a real-time service, etc. The condition data can be related to an access threshold, wherein the access threshold can determine access of the mobile device 108 to the base station 104.

As the mobile device 108 increases distance from the base station 104 and decreases its distance to the adjacent cellular site coverage area 102 and its base station 106, the dBs can be reduced to approach the access threshold. As the dBs approach the access threshold the mobile device 108 can be on the cusp of being unable to receive service. Therefore, any impairment or signal attenuation can cause the mobile device 108 to drop the connection to the base station 104. For instance, if the access threshold is—114 and the mobile device 108 is at—113 and experiences an impairment, such as a building, the dBs may drop below—114 causing the signal to be lost. The base station 106 can receive condition data of the mobile device 108 related to the access threshold as the mobile device 108 nears the cellular site coverage area 102 to prevent signal loss.

The base station 106 can identify a channel based on an attenuation of a signal of the channel and the resource request of the mobile device 108. Once a proper channel has been identified for the service requested by the mobile device 108, the base station 106 can facilitate a channel selection, of the channel, in response to an assessment of the location, the resource request, and the attenuation of the signal of the mobile device 108 as the mobile device 108 transitions from the cellular site coverage area 100 to the other cellular site coverage area 102.

Figure 2:
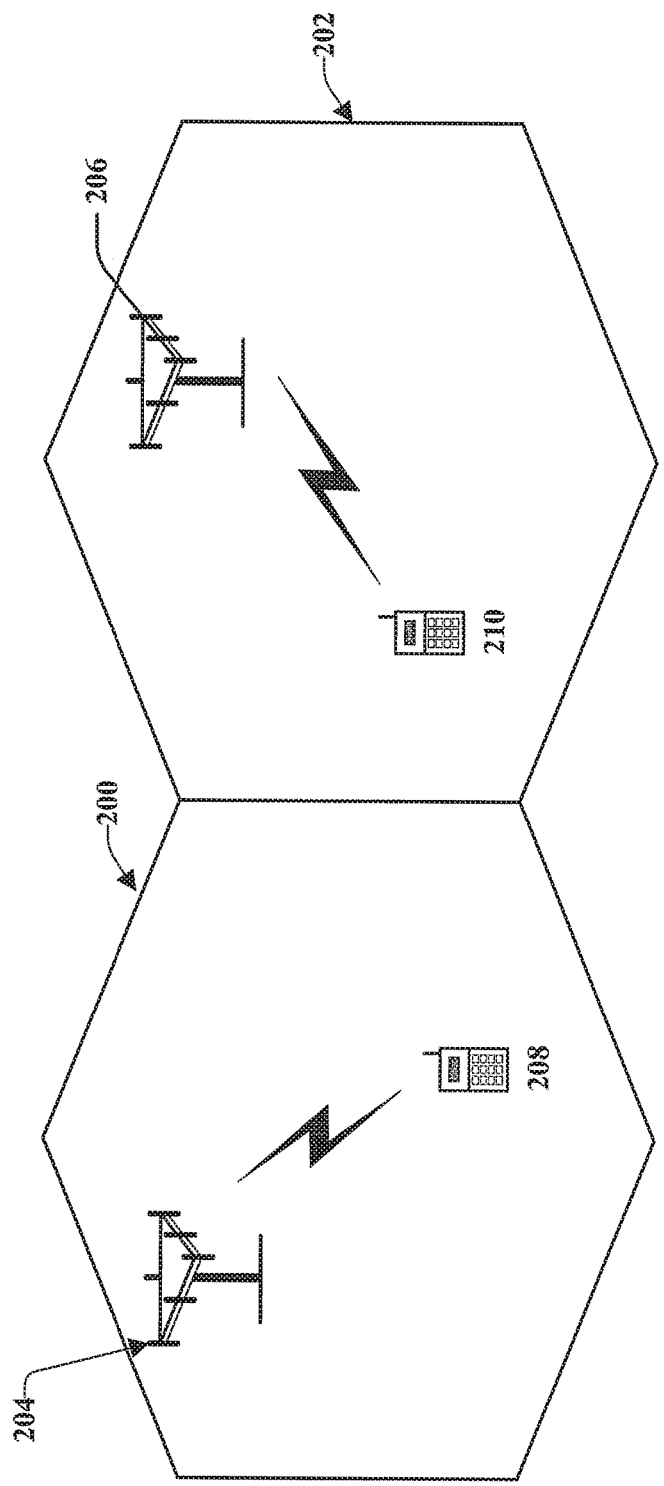
FIG. 2 illustrates an example wireless network performing channel selection for multiple mobile devices transitioning between cellular coverage areas and communicating with base stations respective to each cellular coverage area according to one or more embodiments.

Referring now to FIG. 2, illustrated are multiple mobile devices transitioning between cellular coverage areas and communicating with base stations respective to each cellular coverage area. The cellular network can comprise cellular site coverage areas 200, 202 and base stations 204, 206. A mobile device 208 can communicate with the base station 204 while the mobile device 208 is within the cellular site coverage area 200. A mobile device 210 can communicate with the base station 206 while the mobile device 210 is within the cellular site coverage area 202. The mobile devices 208, 210 can communicate resource request data, location data, and/or condition data related to a condition of access to the base station devices 204, 206 within cellular network. A resource request can comprise a request for a voice call, a video call, an upload/download, a real-time service, etc. The condition data can be related to an access threshold, wherein the access threshold can determine access of the mobile devices 208, 210 to the base stations 204, 206.

As the mobile device 208 increases distance from the base station 204 and decreases its distance to the adjacent cellular site coverage area 202 and its base station 206, the dBs can be reduced to approach the access threshold. As the dBs approach the access threshold the mobile device 208 can be on the cusp of being unable to receive service. Therefore, any impairment or signal attenuation can cause the mobile device 208 to drop the connection to the base station 204. In the same scenario, as the mobile device 210 increases distance from the base station 206 and decreases its distance to the adjacent cellular site coverage area 200 and its base station 204, the dBs can be reduced to approach the access threshold. As the dBs approach the access threshold the mobile device 210 can be on the cusp of being unable to receive service. Therefore, any impairment or signal attenuation can cause the mobile device 210 to drop the connection to the base station 206. For instance, if the access threshold is—114 and the mobile devices 208, 210 are at—113 and experiences an impairment, such as a building, the dBs can drop below—114 causing the signal to be lost. The base stations 206, 204 can receive condition data of the mobile devices 208, 210 related to the access threshold as the mobile devices 208, 210 near the cellular site coverage areas 200, 202 to prevent signal loss. The base stations 206, 204 can then assess how to distribute resources and allocate channels accordingly based on information received from both mobile devices 208, 210 as they transition to other cellular coverage areas.

The base stations 206 can identify a channel based on an attenuation of a signal of the channel and the resource request of the mobile device 208. Once a proper channel has been identified for the service requested by the mobile device 208, the base station 206 can facilitate a channel selection, of the channel, in response to an assessment of the location, the resource request, and the attenuation of the signal of the mobile device 208 as the mobile device 208 transitions from the cellular site coverage area 200 to the other cellular site coverage area 202. Similarly, once a proper channel has been identified for the service requested by the mobile device 210, the base station 204 can facilitate a channel selection, of the channel, in response to an assessment of the location, the resource request, and the attenuation of the signal of the mobile device 210 as the mobile device 210 transitions from the cellular site coverage area 202 to the other cellular site coverage area 200. The cellular network can also take into account the timing and type of resources requested based on the mobile devices 208, 210 simultaneously. For instance, the base station 204 can make a different channel selection for the mobile device 210, as the mobile device 210 transitions toward the cellular site coverage area 200, based on an indication that the mobile device 208 is transitioning toward the other cellular site coverage area 202 and that the mobile device 210 is transitioning toward the cellular site coverage area 200. Effectively, the cellular network can account for the mobile device 208 leaving the cellular site coverage area 200 and the mobile device 210 entering the cellular site coverage area 200 during the channel selection process.

Figure 3:
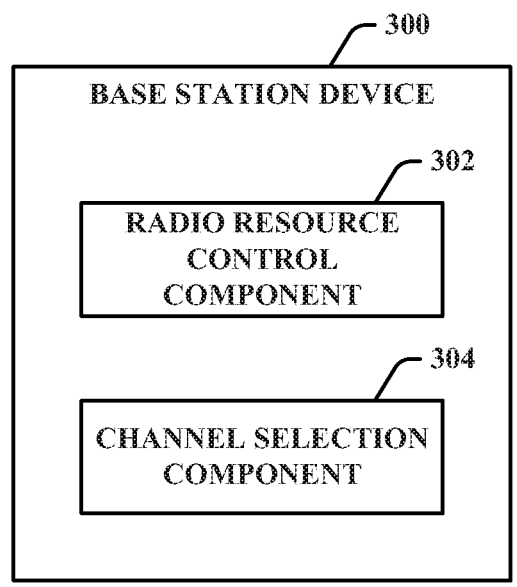
FIG. 3 illustrates an example base station device comprising a radio resource control component and a channel selection component according to one or more embodiments.

Referring now to FIG. 3, illustrated is base station device comprising a radio resource control component and a channel selection component. The base station device 300 can comprise a radio resource control component 302 and a channel selection component 304. The radio resource control component 302 can facilitate access to a resource (voice call, video call, upload/download, etc.) that the mobile device requests. The base station device 300 can also assess/identify a channel, based on the request for a resource, by the channel selection component 304. Once a channel is assessed/identified, the base station device 300 can also facilitate selection of the identified channel via the channel selection component 304.

Figure 4:
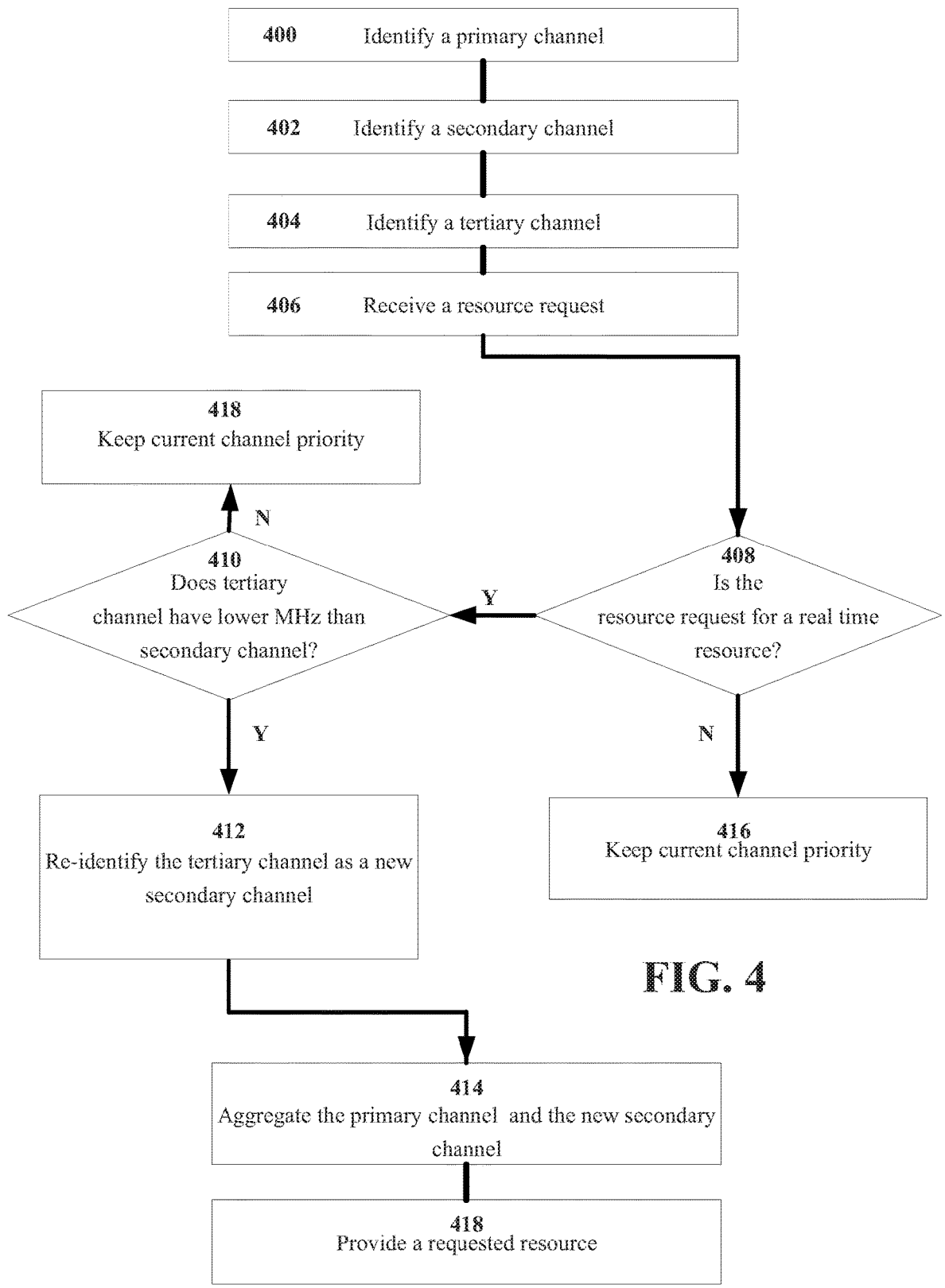
FIG. 4 illustrates an example a flow diagram of channel selection according to one or more embodiments.

Referring now to FIG. 4, illustrated is a flow diagram of channel selection. At element 400 a primary channel can be identified, at element 402 a secondary channel can be identified, and at element 404 a tertiary channel can be identified. A system can receive a resource request at element 406, wherein the resource request can comprise a request for a voice call, a video call, an upload/download, etc. At element 408, a determination can be made as to whether the resource request is for a real-time resource such as the voice call or the video call. If the resource request is not for a real-time resource, then the current priority of the channels can remain the same. Therefore the primary channel, the secondary channel, and the tertiary channel can remain the same at element 416. However, should the resource request be for a request of a real-time resource, then the system can evaluate if the tertiary channel has a lower MHz than the secondary channel at element 410. If the tertiary channel has a higher MHz than the secondary channel at element 410, then the system can keep the current channel priority at element 418. If the tertiary channel has a lower MHz than the secondary channel at element 410, then the system can re-identify the tertiary channel at element 412 as the secondary channel. Thereafter, the system can aggregate the primary channel and the new secondary channels for additional bandwidth at element 414 and provide the requested resource to a mobile device at element 418.

Figure 5:
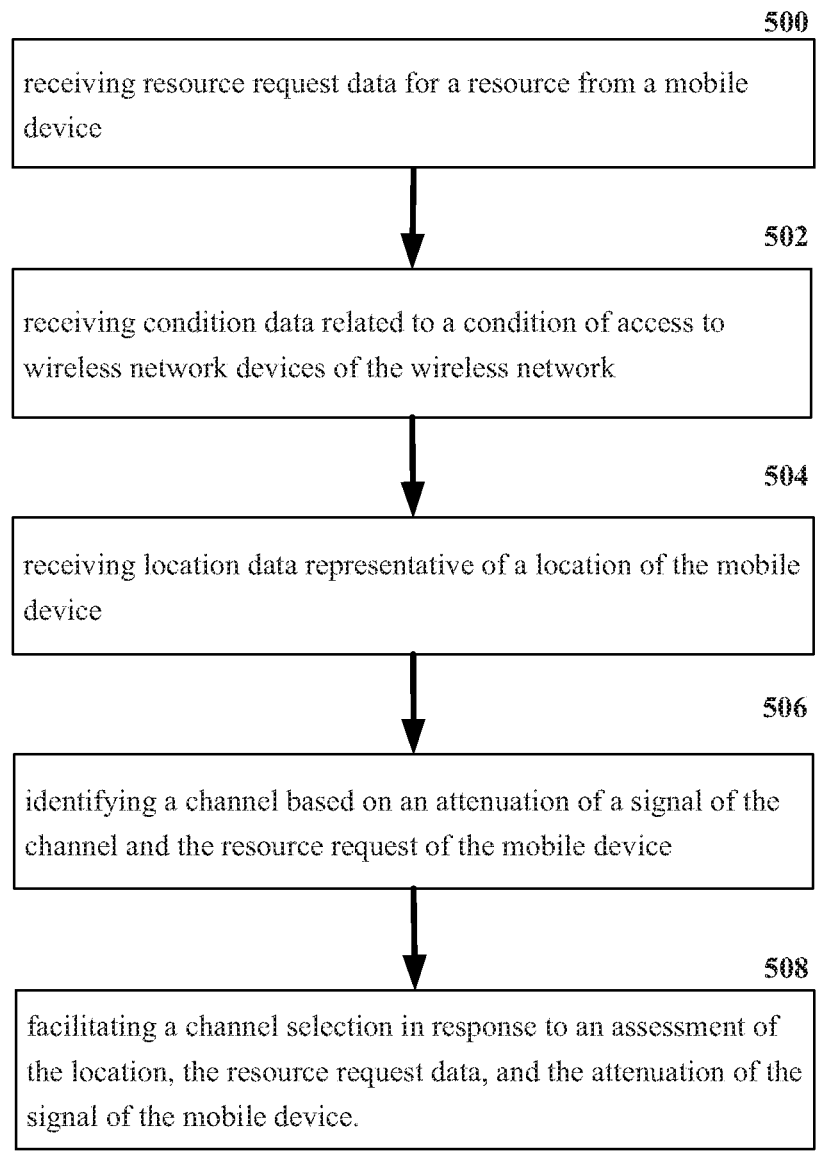
FIG. 5 illustrates an example schematic system block diagram for selecting a channel for a mobile device within a cellular network according to one or more embodiments.

Referring now to FIG. 5, illustrated is a schematic block diagram for selecting a channel for a mobile device within a cellular network. At element 500, resource request data for requesting a resource can be received from a mobile device. The resource request data can comprise a request for a voice call, a video call, an upload/download, etc. Condition data related to a condition of access to wireless network devices of a wireless network can be received at element 502. The condition of access can be related to an access threshold measured in dBs. At element 504, location data representative of a location of the mobile device can be received. The location of the mobile device can be dynamic as the mobile device transitions from one cellular site area to another. Once the resource request data, the condition data, and the location data have been received, at element 506, a channel can be identified based on an attenuation of a signal of the channel and the resource request of the mobile device. Furthermore, a channel selection can be facilitated at element 508 in response to an assessment of the location, the resource request, and the attenuation of the signal of the mobile device.

Figure 6:
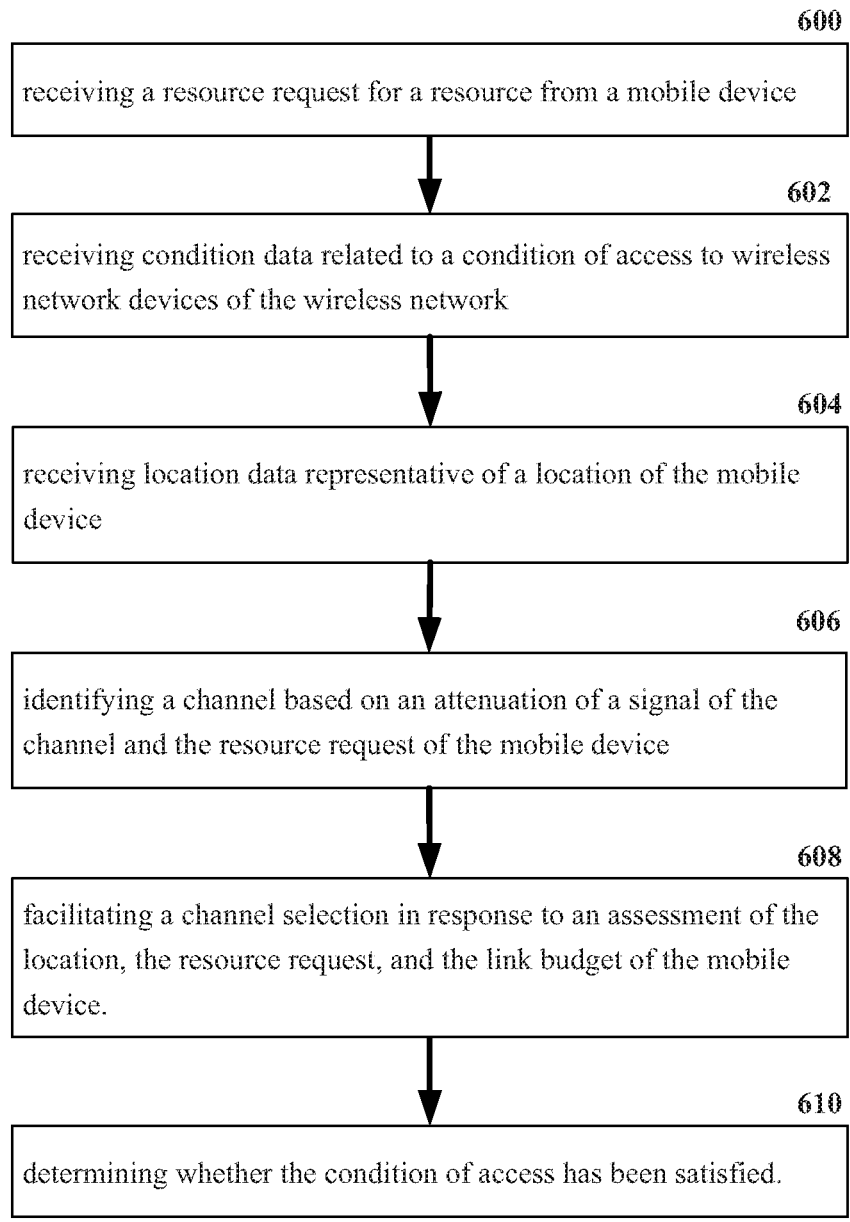
FIG. 6 illustrates an example schematic system block diagram for selecting a channel for a mobile device within a cellular network and determining whether a condition has been satisfied according to one or more embodiments.

Referring now to FIG. 6, illustrated is a schematic block diagram for selecting a channel for a mobile device within a cellular network and determining whether a condition has been satisfied. At element 600, resource request data for requesting a resource can be received from a mobile device. The resource request data can comprise a request for a voice call, a video call, an upload/download, etc. Condition data related to a condition of access to wireless network devices of a wireless network can be received at element 602. The condition of access can be related to an access threshold measured in dBs. At element 604, location data representative of a location of the mobile device can be received. The location of the mobile device can be dynamic as the mobile device transitions from one cellular site area to another. Once the resource request data, the condition data, and the location data have been received, at element 606, a channel can be identified based on an attenuation of a signal of the channel and the resource request of the mobile device. Furthermore, a channel selection can be facilitated at element 608 in response to an assessment of the location, the resource request, and the attenuation of the signal of the mobile device. At element 610, a determination of whether the condition of access has been satisfied can be made. For instance, did the dBs drop below and acceptable threshold level due to a signal impairment.

Figure 7:
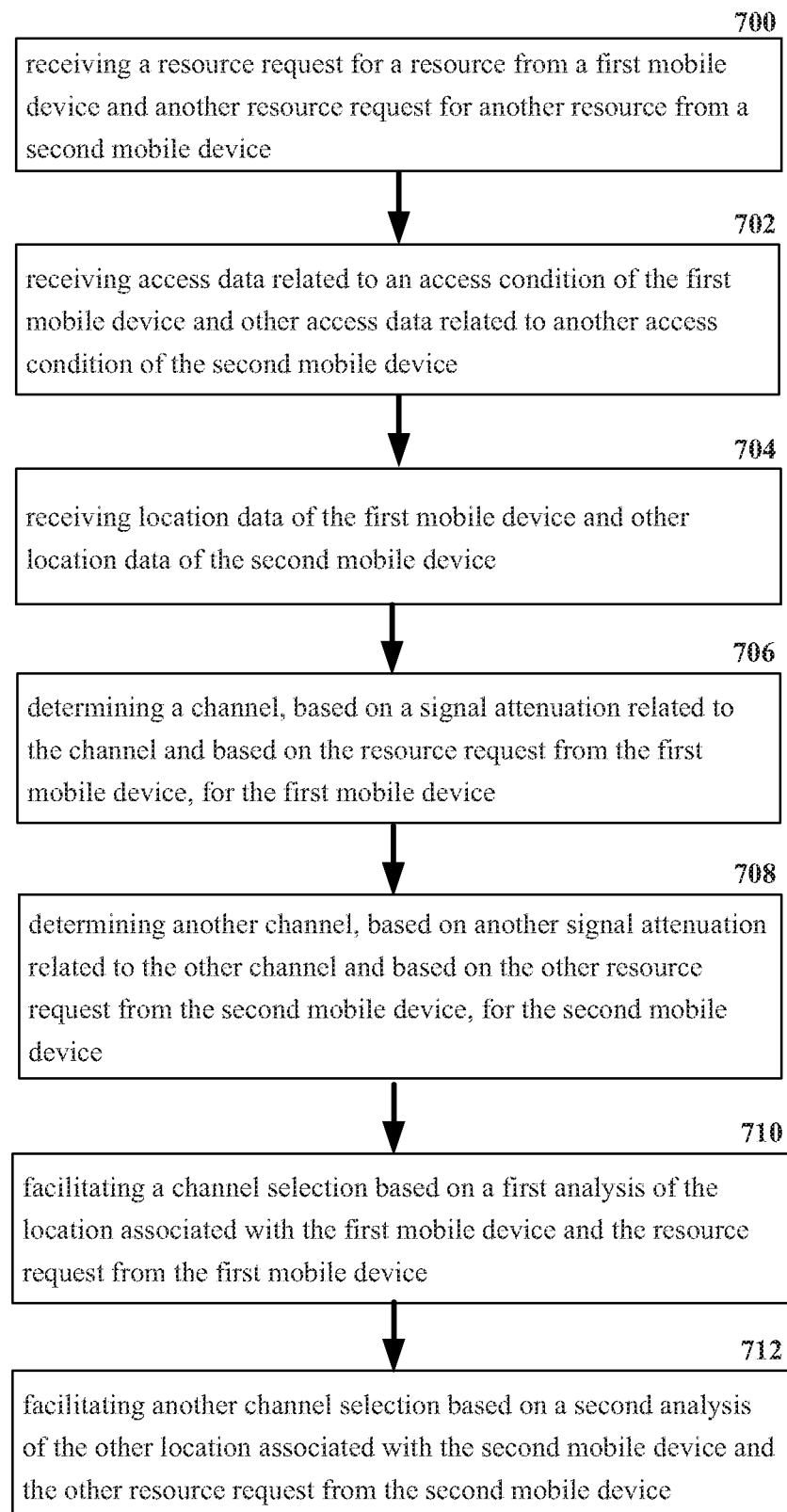
FIG. 7 illustrates an example schematic system block diagram for selecting multiple channels for multiple mobile devices within a cellular network according to one or more embodiments.

Referring now to FIG. 7, illustrated a schematic block diagram for selecting multiple channels for multiple mobile devices within a cellular network. At element 700, a resource request can be received for a resource from a first mobile device and another resource request can be received for another resource from a second mobile device. At element 702, access data related to an access condition of the first mobile device can be received and other access data related to another access condition of the second mobile device can be received. The access data can be related to an access threshold defined by a dB number. Location data of the first mobile device and location data of the second mobile device can also be received at element 704. Based on a signal attenuation related to a channel and based on the resource request form the first mobile device, the channel can be determined at element 706. Consequently, another channel can be determined at element 708 based on another signal attenuation related to the other channel and based on the other resource request from the second mobile device.

Based on a first analysis of the location associated with the first mobile device and the resource request from the first mobile device, the system can facilitate a channel selection at element 710. Furthermore, the system can facilitate another channel selection based on a second analysis of the other location associated with the second mobile device and the other resource request from the second mobile device at element 712. The system can also take into account the timing and type of resources requested based on the first mobile device and the second mobile device simultaneously. For instance, a base station can make a different channel selection for the first mobile device, as the first mobile device transitions towards a second cellular site coverage area, based on an indication that the second mobile device is transitioning towards a first cellular site coverage area and that the second mobile device is transitioning toward the first cellular site coverage area. Effectively, the cellular network can account for the first mobile device leaving the first cellular site coverage area and the second mobile device entering the first cellular site coverage area during the channel selection process.

Figure 8:
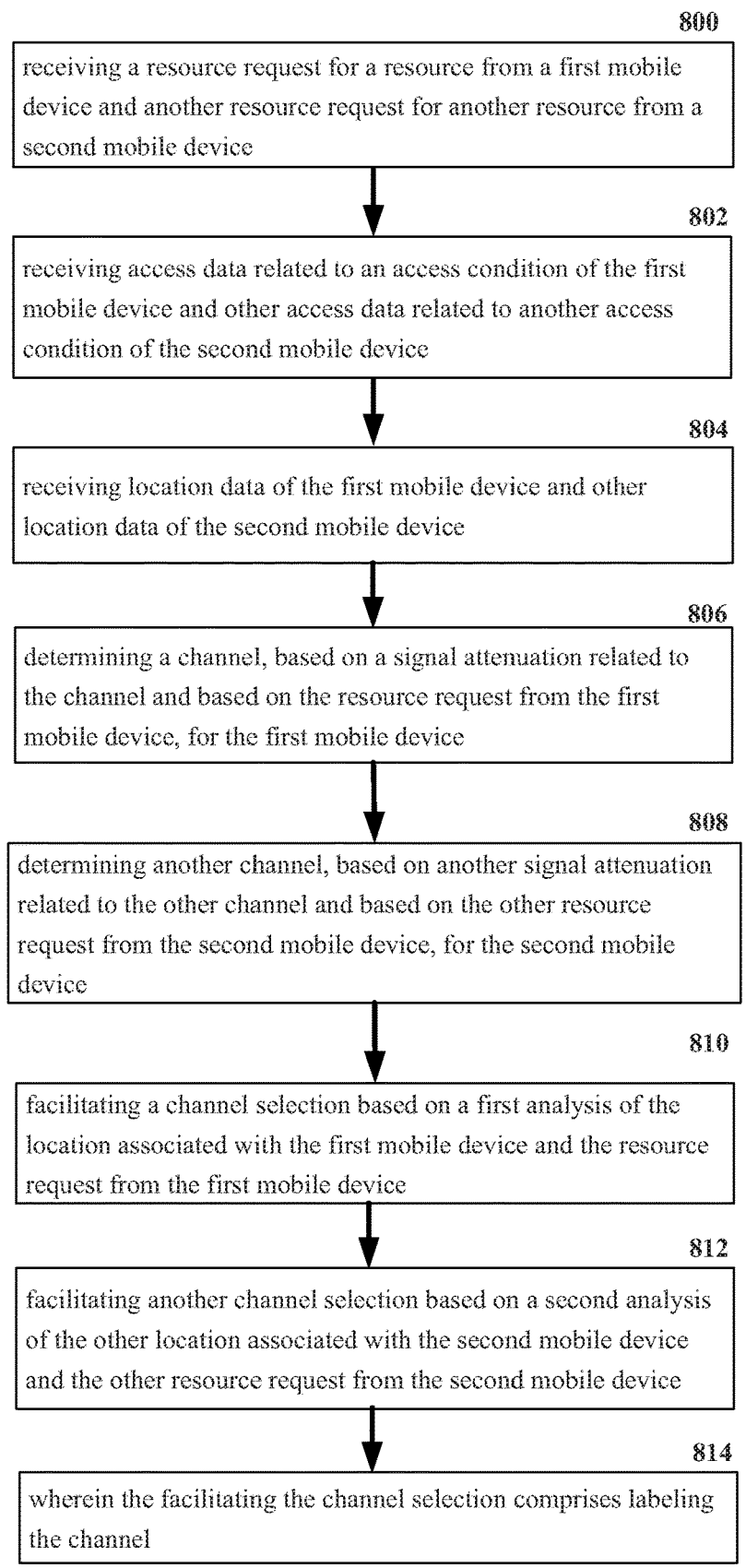
FIG. 8 illustrates an example schematic system block diagram for selecting multiple channels for multiple mobile devices within a cellular network and labeling the channels according to one or more embodiments.

Referring now to FIG. 8, illustrated is a schematic block diagram for selecting multiple channels for multiple mobile devices within a cellular network and labeling the channels. At element 800, a resource request can be received for a resource from a first mobile device and another resource request can be received for another resource from a second mobile device. At element 802, access data related to an access condition of the first mobile device can be received and other access data related to another access condition of the second mobile device can be received. The access data can be related to an access threshold defined by a dB number. Location data of the first mobile device and location data of the second mobile device can also be received at element 804. Based on a signal attenuation related to a channel and based on the resource request form the first mobile device, the channel can be determined at element 806. Consequently, another channel can be determined at element 808 based on another signal attenuation related to the other channel and based on the other resource request from the second mobile device.

Based on a first analysis of the location associated with the first mobile device and the resource request from the first mobile device, the system can facilitate a channel selection at element 810. Furthermore, the system can facilitate another channel selection based on a second analysis of the other location associated with the second mobile device and the other resource request from the second mobile device at element 812. Facilitating the channel selection can also comprise labeling the channels. Channels can be labeled as primary, secondary, and/or tertiary. The channels can also be relabeled using any of the aforementioned terminology.

The system can also take into account the timing and type of resources requested based on the first mobile device and the second mobile device simultaneously. For instance, a base station can make a different channel selection for the first mobile device, as the first mobile device transitions towards a second cellular site coverage area, based on an indication that the second mobile device is transitioning towards a first cellular site coverage area and that the second mobile device is transitioning toward the first cellular site coverage area. Effectively, the cellular network can account for the first mobile device leaving the first cellular site coverage area and the second mobile device entering the first cellular site coverage area during the channel selection process.

Figure 9:
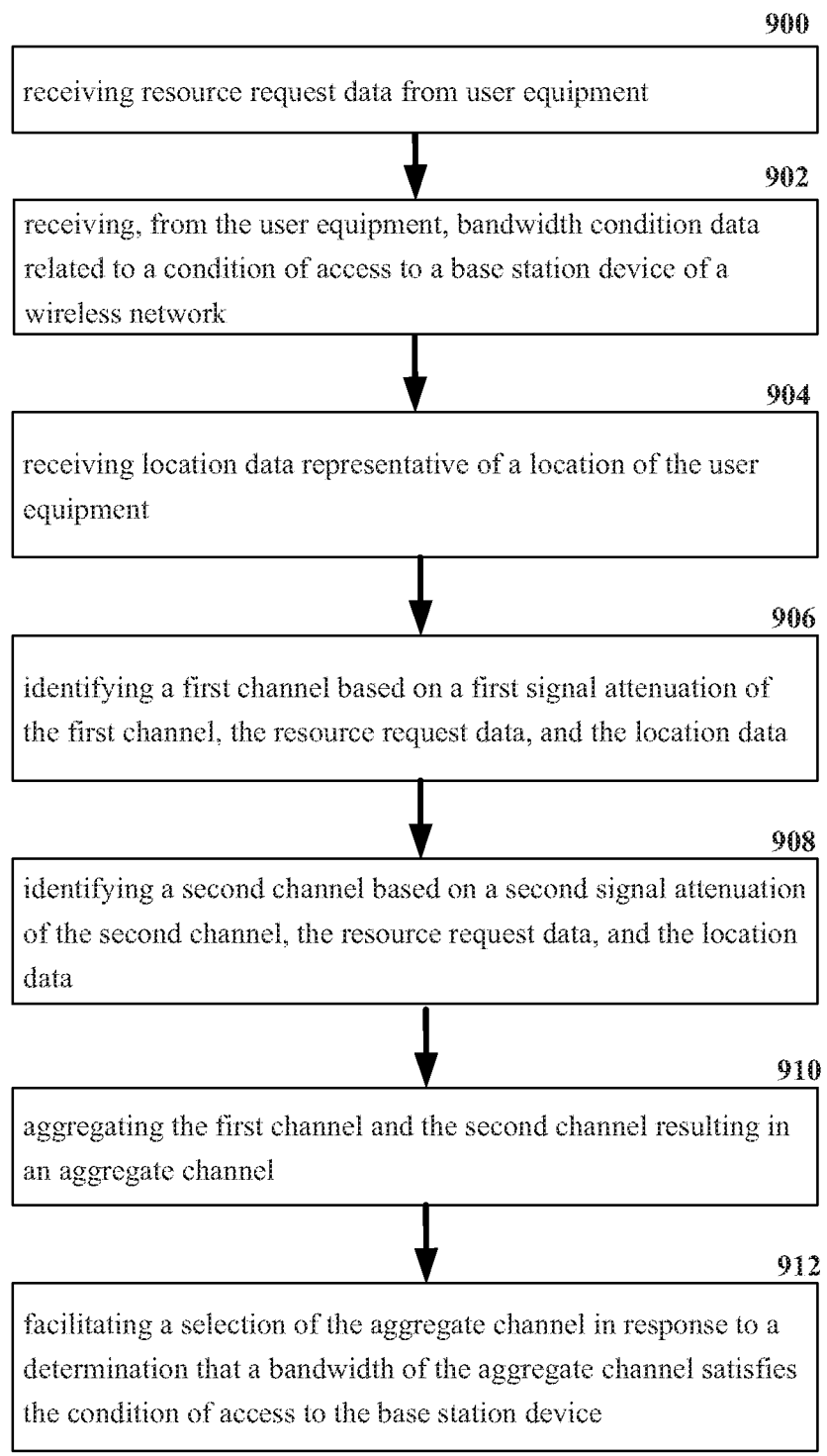
FIG. 9 illustrates an example schematic system block diagram for aggregating channels and selecting an aggregated channel to increase power spectral density according to one or more embodiments.

Referring now to FIG. 9, illustrated is a schematic block diagram for aggregating channels and selecting an aggregated channel to increase power spectral density. At element 900 resource request data can be received from user equipment. The resource request data can comprise a request for a voice call, a video call, an upload/download, etc. At element 902, bandwidth condition data related to a condition of access to a base station device of a wireless network can be received from the user equipment. Condition data related to a condition of access to wireless network devices of a wireless network can be related to an access threshold measured in dBs. Location data representative of a location of the user equipment can be received at element 904, wherein the user equipment can dynamically change locations as it transitions to and from cellular site areas.

At element 906, a first channel can be identified based on a first signal attenuation of the first channel, the resource request data, and the location data. Furthermore, at element 908, a second channel can be identified based on a second signal attenuation of the second channel, the resource request data, and the location data. Thereafter, the first and second channels can be aggregated at element 910, resulting in an aggregate channel. The aggregation process can increase bandwidth for resource dissemination. At element 912, a selection of the aggregate channel can be facilitated in response to a determination that a bandwidth of the aggregate channel satisfies the condition of access to the base station device.

Figure 10:
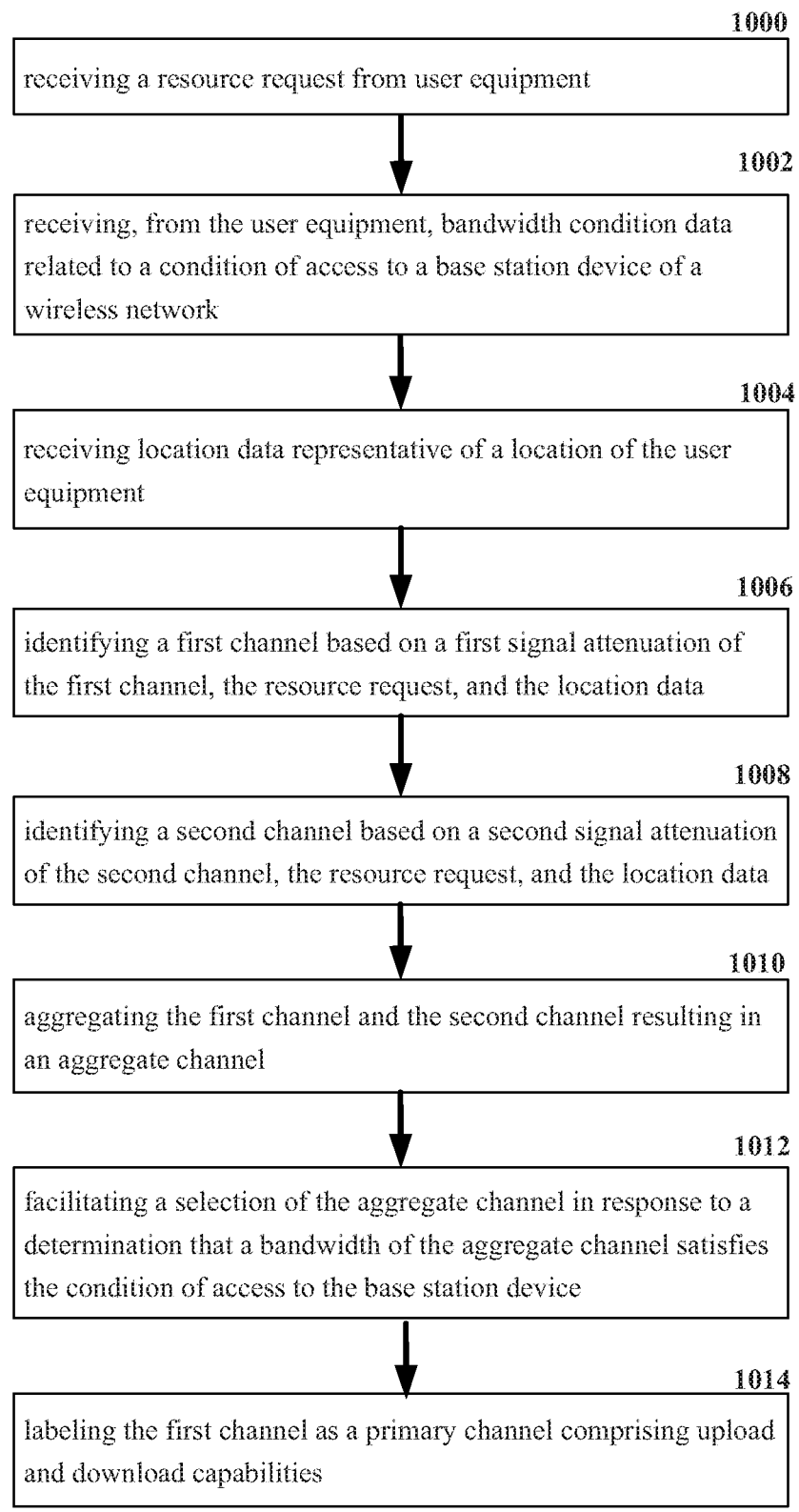
FIG. 10 illustrates an example schematic system block diagram for aggregating channels, selecting an aggregated channel, and labeling a primary channel to increase power spectral density according to one or more embodiments.

Referring now to FIG. 10, illustrated is a schematic block diagram for aggregating channels, selecting an aggregated channel, and labeling a primary channel to increase power spectral density. At element 1000 resource request data can be received from user equipment. The resource request data can comprise a request for a voice call, a video call, an upload/download, etc. At element 1002, bandwidth condition data related to a condition of access to a base station device of a wireless network can be received from the user equipment. Condition data related to a condition of access to wireless network devices of a wireless network can be related to an access threshold measured in dBs. Location data representative of a location of the user equipment can be received at element 1004, wherein the user equipment can dynamically change locations as it transitions to and from cellular site areas.

At element 1006, a first channel can be identified based on a first signal attenuation of the first channel, the resource request data, and the location data. Furthermore, at element 908, a second channel can be identified based on a second signal attenuation of the second channel, the resource request data, and the location data. Thereafter, the first and second channels can be aggregated at element 1010, resulting in an aggregate channel. The aggregation process can increase bandwidth for resource dissemination. At element 1012, a selection of the aggregate channel can be facilitated in response to a determination that a bandwidth of the aggregate channel satisfies the condition of access to the base station device, and the first channel can be labeled as a primary channel comprising upload and download capabilities at element 1014.

Figure 11:
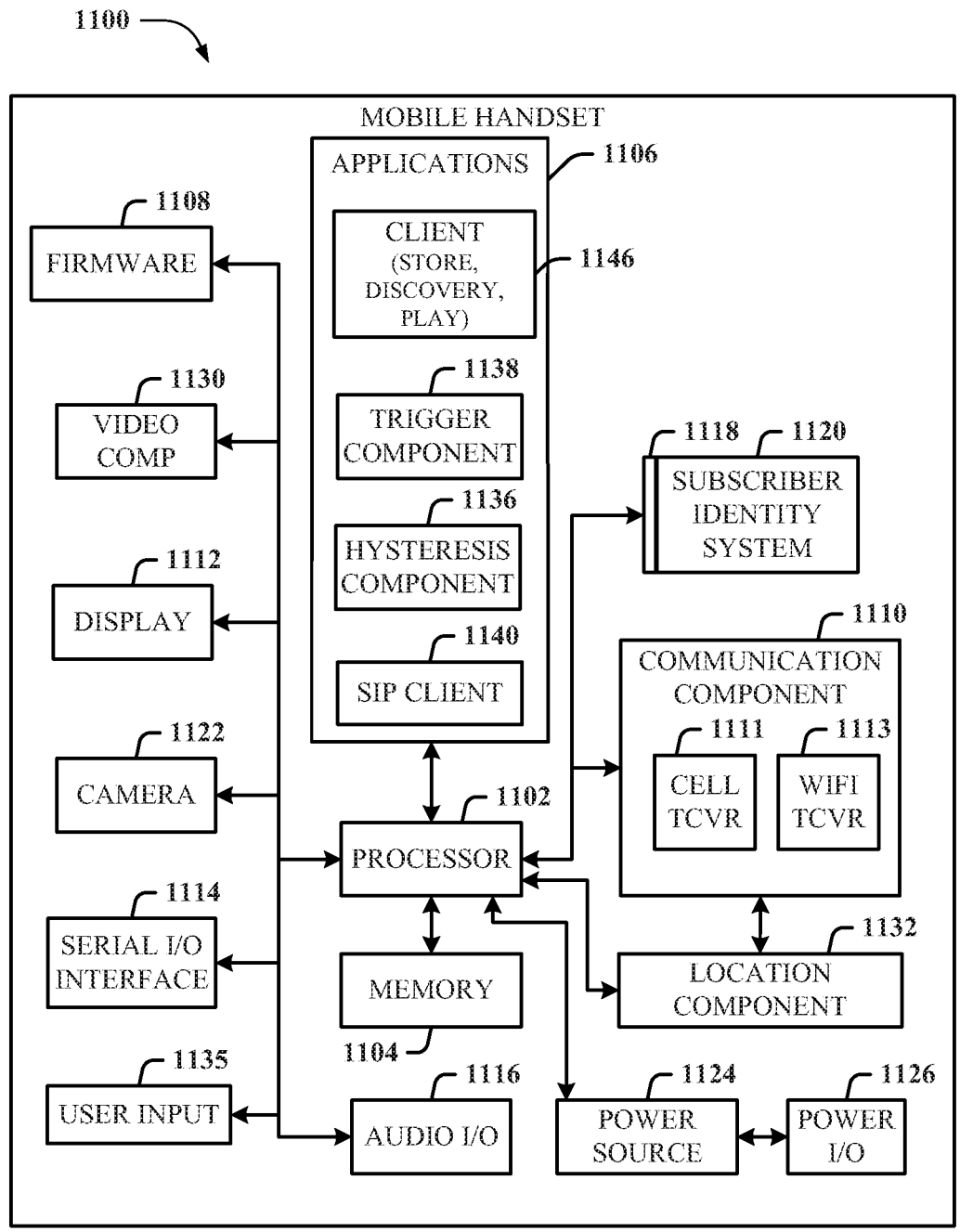
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
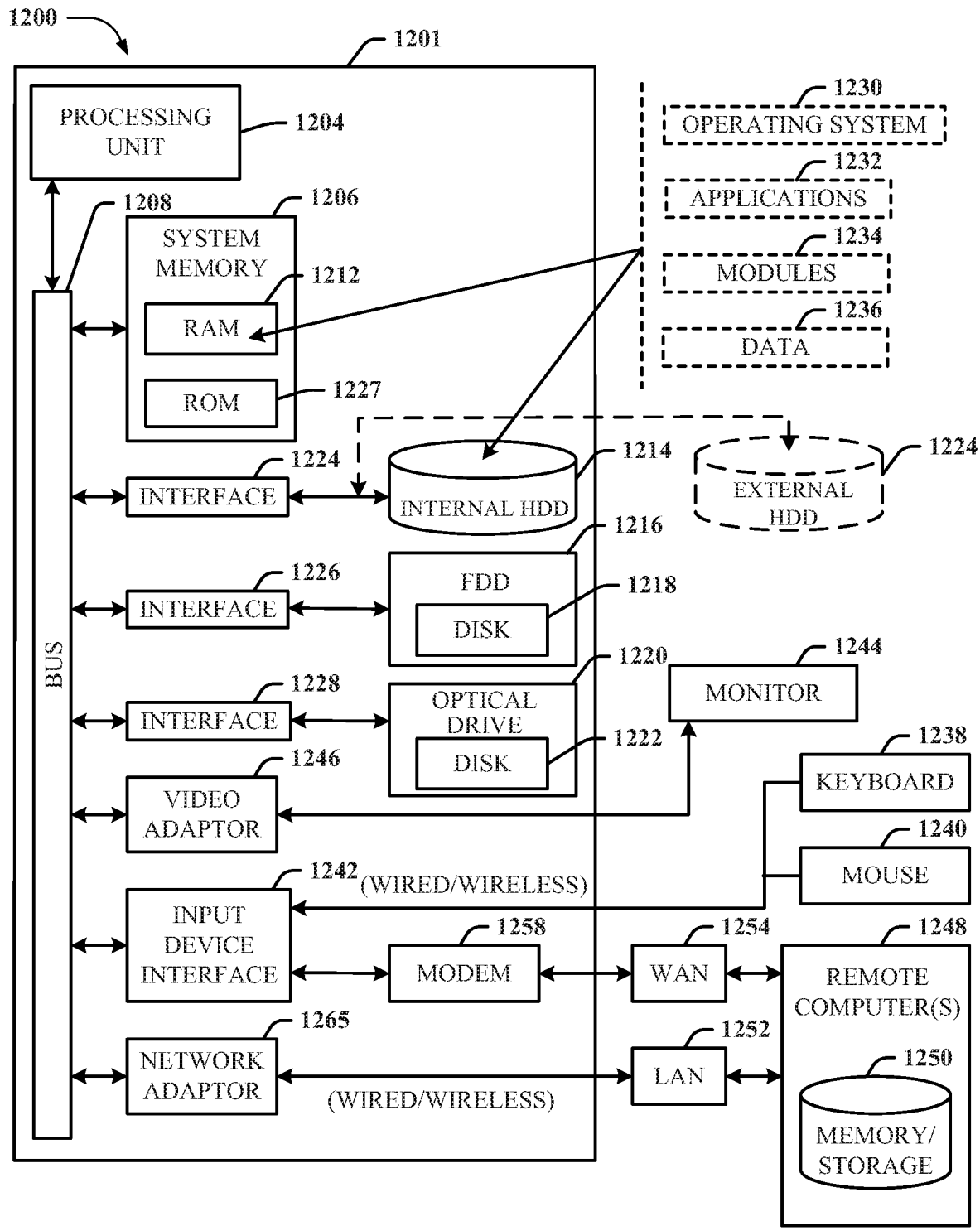
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    receiving, by a first wireless network device comprising a processor, first location data representative of a first location of a first mobile device, wherein the first location is closer to the first wireless network device than a first previous location of the first mobile device;
    receiving, by the first wireless network device, second location data representative of a second location of a second mobile device, wherein the second location is closer to a second wireless network device than a second previous location of the second mobile device;
    identifying, by the first wireless network device, a channel based on an attenuation of a signal of the channel and a resource request of the first mobile device;
    identifying, by the first wireless network device, a first priority associated with the channel;
    based on the resource request from the first mobile device, re-identifying, by the first wireless network device, the first priority as a second priority associated with the channel, the second priority being different from the first priority, wherein the re-identifying comprises labeling the channel as a primary channel comprising upload and download capabilities; and
    based on the first location of the first mobile device, the labeling the channel, and the attenuation of the signal of the first mobile device, selecting, by the first wireless network device, the channel for a communication between the first mobile device and the first wireless network device.

2. The method of claim 1, further comprising:
    determining, by the first wireless network device, whether a condition of access has been satisfied.

3. The method of claim 1, wherein the resource request comprises a request for a voice call.

4. The method of claim 1, further comprising:
    receiving, by the first wireless network device of a wireless network, the resource request for a resource from the first mobile device.

5. The method of claim 1, further comprising:
    based on the first location data of the first mobile device and third location data of a first base station device, determining, by the first wireless network device, a distance between the first mobile device and the first base station device.

6. The method of claim 5, further comprising:
    determining, by the first wireless network device, the distance of the first mobile device relative to the first base station device and a second base station device based on the first location of the first mobile device, the third location data related to the first base station device, and fourth location data related to the second base station device.

7. The method of claim 1, further comprising:
receiving, by the first wireless network device from the first mobile device, condition data related to a condition of access to wireless network devices of the wireless network.

8. The method of claim 1, wherein the identifying the channel comprises labeling the channel as a potential channel for selection.

9. The method of claim 1, wherein the resource request comprises a request for a video call.

10. A system, comprising:
a processor; and a memory that stores executable instructions that, when executed by the processor, facilitate performance of operations, comprising:
receiving first location data representative of a first location of a first mobile device and second location data representative of a second location of a second mobile device, wherein the first location is closer to a first wireless network device than a first previous location of the first mobile device, and wherein the second location is closer to a second wireless network device than a second previous location of the second mobile device;
determining a first channel, based on a first signal attenuation related to the first channel and based on a first resource request from the first mobile device, for the first mobile device;
determining a second channel, based on a second signal attenuation related to the second channel and based on a second resource request from the second mobile device, for the second mobile device;
in response to the first resource request, modifying a priority label associated with the first channel from a first label to a second label, wherein the modifying comprises:
labeling the first channel as a primary channel comprising upload capabilities and download capabilities; and
labeling the second channel as a secondary channel comprising the download capabilities;
based on the modifying and a first analysis of the first location data associated with the first mobile device and the first resource request from the first mobile device, facilitating a first channel selection; and
facilitating a second channel selection based on a second analysis of the second location data associated with the second mobile device and the second resource request from the second mobile device.

11. The system of claim 10, wherein the facilitating the second channel selection comprises labeling the second channel based on the second resource request.

12. The system of claim 11, wherein the facilitating the second channel selection comprises relabeling the second channel.

13. The system of claim 10, wherein the first resource request is initiated in response to initiating a video call.

14. The system of claim 10, wherein the first resource request is initiated in response to initiating a voice call.

15. A non-transitory machine-readable medium, comprising executable instructions that, when executed by a processor, facilitate performance of operations, comprising:
receiving location data representative of a location of user equipment, wherein the location is closer to a base station device than a previous location of the user equipment;
based on a first signal attenuation of a first channel, resource request data from the user equipment, and the location data, identifying the first channel;
based on the resource request data, identifying a first priority associated with the first channel and a first bandwidth associated with the first channel;
based on a second signal attenuation of a second channel, the resource request data, and the location data, identifying the second channel;
based on an indication that a second bandwidth associated with the second channel is higher than the first bandwidth, modifying the first priority to a second priority, different than the first priority, to be associated with the first channel, wherein the modifying comprises labeling the first priority of the second channel as a secondary channel comprising download capabilities;
aggregating the first channel and the second channel, resulting in an aggregate channel; and
in response to the labeling the first priority of the second channel as the secondary channel, facilitating a selection of the aggregate channel for communication between the user equipment and the base station device.

16. The non-transitory machine-readable medium of claim 15, wherein the operations further comprise:
labeling the first channel as a primary channel comprising upload and download capabilities.

17. The non-transitory machine-readable medium of claim 15, wherein the second channel comprises download capabilities.

18. The non-transitory machine-readable medium of claim 15, wherein the operations further comprise:
labeling a third channel as a tertiary channel comprising download capabilities.

19. The non-transitory machine-readable medium of claim 15, wherein the resource request data is generated in response to initiating a video call.

20. The non-transitory machine-readable medium of claim 15, wherein the resource request data is generated in response to initiating a voice call.

* * * * *